United States Patent
Ansfield et al.

(10) Patent No.: US 8,730,356 B2
(45) Date of Patent: May 20, 2014

(54) SYSTEM AND METHOD FOR AUTOMATIC FLASH REMOVAL FROM IMAGES

(75) Inventors: Frederick William Ansfield, San Diego, CA (US); Kirstin Connors, San Diego, CA (US)

(73) Assignee: Sony Corporation, Tokyo (JP)

( * ) Notice: Subject to any disclaimer, the term of this patent is extended or adjusted under 35 U.S.C. 154(b) by 566 days.

(21) Appl. No.: 13/042,381

(22) Filed: Mar. 7, 2011

(65) Prior Publication Data

US 2012/0229681 A1    Sep. 13, 2012

(51) Int. Cl.
*H04N 5/217*    (2011.01)
*H04N 5/222*    (2006.01)
*G06K 9/40*    (2006.01)

(52) U.S. Cl.
USPC .......................... 348/241; 348/371; 382/274

(58) Field of Classification Search
USPC ........... 348/241, 370, 371; 382/254, 274, 275
See application file for complete search history.

(56) References Cited

U.S. PATENT DOCUMENTS

| | | | | |
|---|---|---|---|---|
| 7,136,537 | B2* | 11/2006 | Pilu et al. .................. | 382/274 |
| 7,630,002 | B2* | 12/2009 | Jenkins ...................... | 348/218.1 |
| 7,729,607 | B2* | 6/2010 | Karim ......................... | 396/155 |
| 7,760,962 | B2 | 7/2010 | Sambongi et al. | |
| 8,174,739 | B2* | 5/2012 | Proudfoot et al. ........... | 358/475 |
| 2002/0113882 | A1* | 8/2002 | Pollard et al. ................ | 348/239 |
| 2005/0129324 | A1* | 6/2005 | Lemke .......................... | 382/254 |
| 2010/0182453 | A1 | 7/2010 | Nagai | |
| 2010/0271512 | A1 | 10/2010 | Garten | |

OTHER PUBLICATIONS

Bertalmio, Marcelo and Stacey Levine, Fusion of Bracketing Pictures, Departamento de Tecnologias de la Informacion y las Communicaciones, Universitat Pompeu Fabra Tanger, Barcelona, Spain and Department of Mathematics and Computer Science, Duquesne University, Pitsssburgh, PA, US, IEEE Computer Society, 2009 Converence for Visual Media Production, Nov. 12-13, 2009.

* cited by examiner

*Primary Examiner* — Timothy J Henn

(74) *Attorney, Agent, or Firm* — Fitch, Even, Tabin & Flannery LLP

(57) ABSTRACT

A system, method, computer program product, and business method for automatic image glare removal. Glare is often caused by direct reflection of a photographic flash. Images are acquired from at least two different locations, possibly simultaneously, and from one or more cameras, and digitized if necessary. A glare pattern is identified, typically by recognition of a fully overexposed area or known test glare patterns. The images are processed to remove the glare pattern by subtraction of the glare pattern from at least one image and substitution of corresponding data from a related image not identically impacted. The substituted data typically comprises chrominance data, which may be from a luminance-adjusted exposure-bracketed image. The processing may be performed by a camera, a pc, or a networked server, and the processed image is output. The business method includes automated image glare removal via a fee-based per-transaction or subscription service.

28 Claims, 4 Drawing Sheets

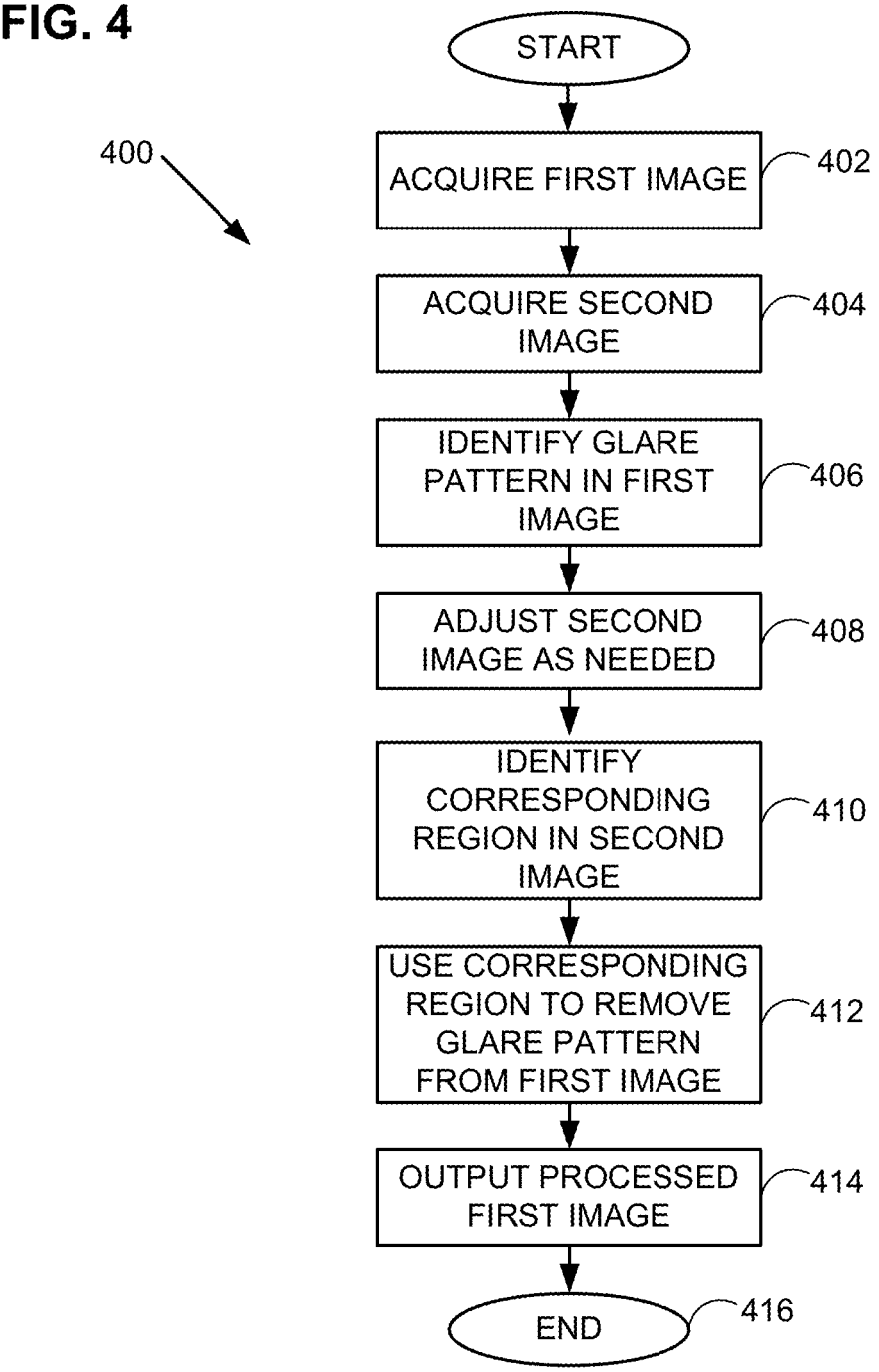

SYSTEM AND METHOD FOR AUTOMATIC FLASH REMOVAL FROM IMAGES

FIELD OF THE INVENTION

The present patent document relates in general to enhancing photographic images by removing localized glare regions, specifically those due to direct reflection from a flash system.

BACKGROUND OF THE INVENTION

Both professional and amateur photographers are familiar with the problem of glare, which is a very harsh bright light that may cause regions of total or near-total overexposure in photographic images. Glare may occur due to light reflections from a wide variety of objects, including flat glass surfaces such as windows, mirrors, and aquariums, as well as eyeglasses, TV sets, moving water, chrome on cars, and facets on jewelry. Reflective items being photographed for auction purposes for example often require a surrounding diffuse lighting screen to allow clear photography. Glare may also be caused by very intense point-like light sources such as studio, theatrical, or stadium lights, the sun, and Christmas tree lights. Reflections and point-like light sources may also cause lens flare-related image artifacts, as is known in the art.

The light from a photographic flash reflecting back to the camera, typically very directly from flat surfaces, is however the most common cause of image glare. Amateur photographers in particular routinely have problems with flash-related artifacts in their images, especially when using a camera that has a fixed flash system near the lens. Underwater photography is particularly challenging because a flash is nearly always required.

Photographic flash systems may be used to successfully augment available light, but such use is not without complications, even for professionals. Flash-based image artifacts may not be noticed nor their impact on image quality fully appreciated at the time an image is taken. Getting the best overall exposure from the combination of available light and flash illumination is not always easy. As a result, photographers sometimes take bracketed images, wherein the exposure level for each image is varied both above and below a particular setting. The photographer must hope that one of the images will prove to be adequately lit overall and not marred by artifacts. Otherwise, the typical alternative is to painstakingly manually retouch photos, often using various software tools for assistance. Unfortunately, this practice may be very time intensive and may produce rather crude results. Therefore, detrimental image artifacts may discourage the use of flash systems, even with bracketing and software retouching.

As a result, there is a need for a tool to automatically remove glare artifacts from photographic images, particularly those pictures taken with a flash unit.

SUMMARY OF THE EMBODIMENTS

A system, method, business method, and computer program product for automatic image glare removal are disclosed and claimed herein. Exemplary embodiments acquire images from at least two different locations, preferably simultaneously, from one or more cameras, and digitize them if necessary. Recognition of a fully overexposed area or known test glare patterns then leads to a precise glare pattern identification. The exemplary embodiments then process the images to remove the glare pattern by subtraction of the glare pattern from at least one image and substitution or intermixing of corresponding data from a related image not identically marred by glare. The substituted data typically comprises chrominance data, which may be from a luminance-adjusted exposure-bracketed image. A camera, a local personal computer, or a networked server may perform the processing, and then output the processed image. The business method includes automated image glare removal via a free or fee-based per-transaction or subscription service.

As described more fully below, the apparatus and processes of the embodiments disclosed permit automatic image glare removal. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

BRIEF DESCRIPTION OF THE DRAWINGS

FIG. 4 depicts a flow diagram of a process for an embodiment of the invention.

DETAILED DESCRIPTION OF EXEMPLARY EMBODIMENTS

Figure 1:
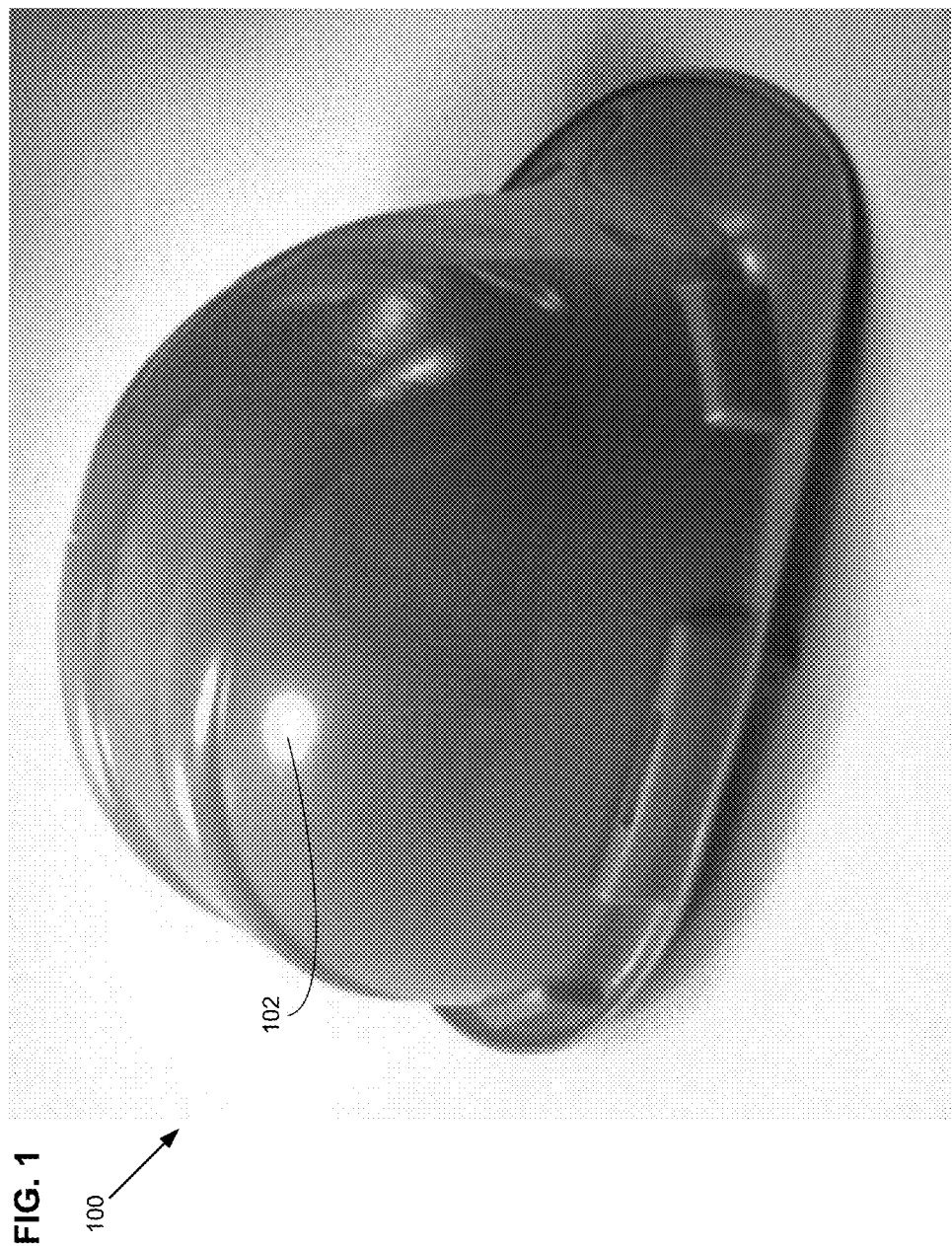
FIG. 1 depicts an image of an object displaying a typical photographic image glare pattern to be removed by embodiments of the invention.

Referring now to FIG. 1, an image 100 of a hardhat is shown, displaying a typical photographic image glare pattern 102 to be removed by various embodiments. The hardhat is an exemplary photographic subject that has a smooth shiny surface that strongly reflects incoming illumination back towards the viewer from at least one point. Image 100 is the input image to be processed by the embodiments.

Figure 2:
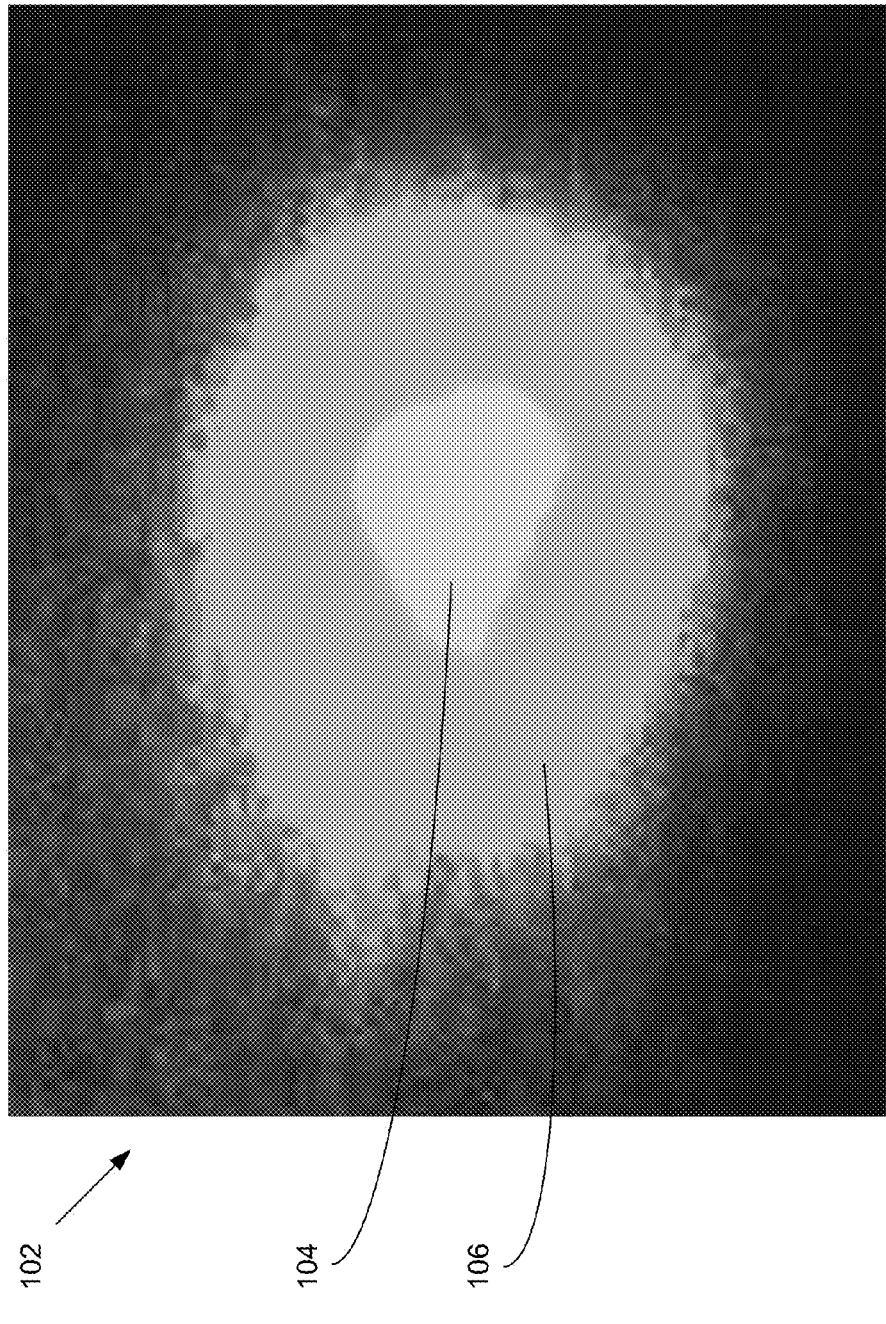
FIG. 2 depicts an enlargement of the glare pattern of FIG. 1 to be removed by embodiments of the invention.

Referring now to FIG. 2, an enlargement of the glare pattern 102 of FIG. 1 to be removed by embodiments is shown. Glare pattern 102 includes a central region 104 that is often completely overexposed, i.e. appears to be completely white regardless of most contrast and brightness adjustments. Glare pattern 102 may also include an outer partially overexposed radial region, shown here as item 106. Such a region often appears more distinctly in images with reflections from curved surfaces than flat surfaces.

Exemplary embodiments identify glare patterns 102 automatically, so they may be processed separately from the rest of image 100. Various ways exist to identify glare patterns 102 in images. First, completely overexposed image regions 104 may serve as readily detectable glare pattern indicia. Second, outer partially overexposed radial regions 106 surrounding such completely overexposed central image regions 104 may help verify the detection of a glare pattern. Third, test images obtained during camera design and manufacture may yield glare patterns that may be stored and characterized, along with lens flare patterns. Point reflectors photographed against a black background at various locations in the image field may yield a good model of glare for each lens used to capture images, including lens flare artifacts. Each lens in a multi-lens camera may have a different glare model, as each lens may for example have a different geometric relationship to a flash source, leading to a different "flash bounce". Multiple flash sources may be employed, each potentially causing different glare patterns 102. Finally, flash sources may have known color spectra and beam patterns that may be used to identify portions of a glare pattern 102 in an image that are not completely white (e.g. the partially overexposed radial regions 106).

Figure 3:
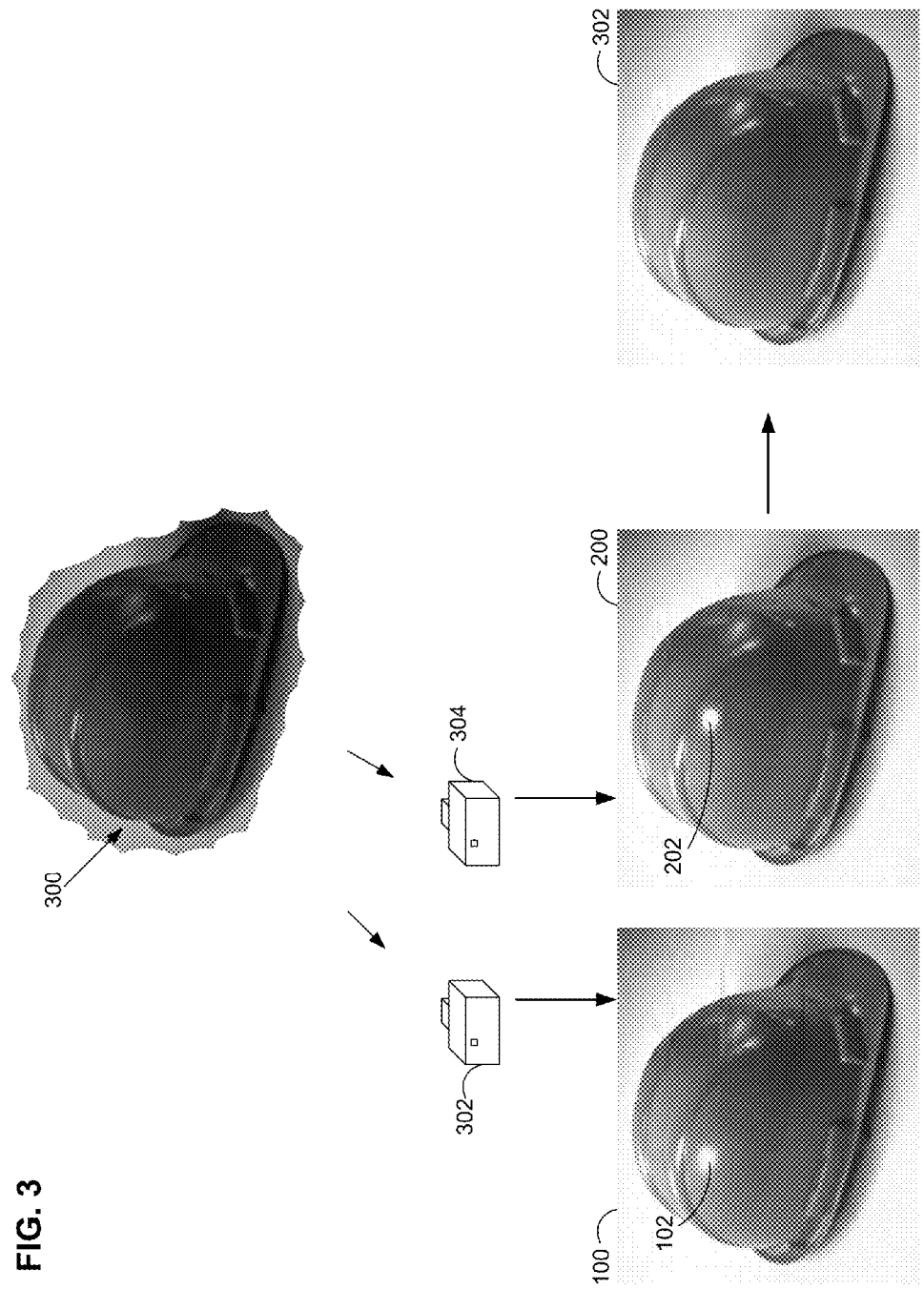
FIG. 3 depicts an embodiment of the invention that captures at least two images of an object from different locations.

Referring now to FIG. 3, a diagram of an embodiment that captures at least two images of an object from different locations is shown. Object 300 (shown with scalloped edges to note that it is an actual object versus an image) is depicted as seen in ambient light. A second fill-in light source will to be used to better illuminate object 300, but of course this raises the possibility of problems with glare. Cameras 302 and 304 acquire images 100 and 200, respectively, from two distinct spatial points. Cameras 302 and 304 may actually comprise two separate lenses in a single camera housing (not shown). Alternately, the embodiment may capture more than two images, as is often the case with so-called "3D" cameras used for stereo photography. Indeed, one embodiment employs a 3D camera per se. The exemplary embodiment preferably captures images simultaneously, to prevent intervening motion from complicating the glare removal process.

Cameras 302 and/or 304 may be film cameras, digital cameras, infrared cameras, night vision cameras, or video cameras that provide images sampled from video output. The cameras may have crossed polarizing lenses for partial glare reduction, and may be traffic cameras used by law enforcement for example at intersections to clearly photograph vehicle license plates. The cameras may also be mounted on any vehicle such as a car, a truck, an airplane, and an unmanned aerial vehicle. The cameras may be part of a heads-up display that provides improved vision for drivers and pilots, for example, to help reduce accidents. The cameras may also be part of an "augmented reality" system that provides improved telepresence for remotely operated vehicles.

Image 100 is the image previously depicted in FIG. 1. Image 200 differs primarily in the location of the glare pattern 202 within the image, due mainly to the different point of view or spatial location from which image 200 was acquired. The region of image 100 marred by glare pattern 102 is preferably unmarred in a corresponding portion of image 200, as shown. The unmarred image information corresponding to glare pattern 102 may be sampled from image 200 and used to replace or augment the portion of image 100 marred by glare. Output image 302 is thus a version of image 100 that has had glare pattern 102 removed by an embodiment. Note that in general any combination of images may be used to provide unmarred image information for glare removal from any particular target image for any glare patterns.

Image 200 will not be completely identical to image 100, but may be adjusted by the embodiments to compensate for several factors prior to sampling of the corresponding image portion. First, since image 200 was taken from a different location, it will need to be geometrically adjusted for perspective or keystone distortion; this adjustment method is known in the art. Second, image 200 may not have the same overall brightness as image 100, so its luminance may need to be adjusted to match as closely as possible; this adjustment is also known in the art.

Image 200 may contain glare patterns of its own (e.g. item 202), and if these spatially overlap the glare patterns of image 100 (e.g. item 102) then image 200 may not be suitable for use in the glare removal process. Embodiments may make this determination from the adjusted version of image 200. Once the exemplary embodiments find the image area of image 200 corresponding to glare pattern 102 to be useful, they effectively overlay or intermix chrominance information from that corresponding area with the overexposed and/or partially overexposed portions of glare pattern 102. The normal unmarred color from image 200 thus replaces to some extent the marred color from image 100, removing glare pattern 102.

Further embodiments may also employ bracketing techniques, which are known in the art, to enhance image quality. Bracketing generally refers to taking multiple photographs of a subject, each with exposure levels both deliberately above and below an estimated optimal setting. The intended result is to cover the full brightness range for most or all parts of the image area for maximum dynamic contrast. Exemplary embodiments may better identify glare patterns by comparing bracketed image sets; darker, more underexposed images may have smaller glare patterns 102, particularly with less prominent partially overexposed radial regions 106.

Referring now to FIG. 4, a flow diagram of a process for an embodiment is shown. Process 400 begins from a START state, which is typically when a photographer triggers a camera setup for example. In step 402 the process acquires a first image from a first location. In step 404, the process acquires a second image from a second location that is different from the first location. The second image is preferably acquired at substantially the same time as the first image. Additional images may also be captured (not shown). In step 406, the process identifies the glare patterns in the first image. These glare patterns are regions that lack sufficient descriptive information about the object being photographed due to overexposure from reflected light. The process seeks to correct this difficulty and increase image quality by estimating the insufficient information from corresponding portions of other similar images.

In step 408, process 400 adjusts the second image to render it more useful for providing the descriptive information needed to remove glare patterns from the first image. Next, in step 410, the process identifies in the second image those regions corresponding to the glare pattern locations in the first image. In step 412, process 400 substitutes or intermixes identified regions of the second image to remove glare patterns from the first image. Finally, the process outputs the processed first image in step 414 and the process ends in step 416.

A camera may perform the glare pattern removal processing if it has sufficient computing power. In other exemplary embodiments, a local computer such as a personal computer into which images are transferred, or a server computer performs the processing. The processing computer may be connected to the camera via a wired or wireless network. The images may be initially non-digital, but are digitized by embodiments as needed prior to processing. The processing computer may return the processed image directly to the camera for storage, or otherwise output the processed image, e.g. via color printer, e-mail, or online storage site. Other exemplary embodiments may perform the processing as a business method, wherein a user is provided the processing as a free promotion or pays a fee for the glare removal service, for example on either a per-processing or subscription basis.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, a radio frequency (RF) link, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the automatic glare removal tool described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A method of automatic image glare removal, comprising:
    acquiring a plurality of images from a plurality of locations;
    identifying at least one glare pattern in at least one of the images;
    processing the images to remove the at least one glare pattern; and
    outputting at least one processed image;
    wherein identifying the glare pattern comprises:
        recording at least one test glare pattern on at least one test image; and
        recognizing the glare pattern by comparison against the test glare pattern.

2. The method of claim 1 wherein the images are acquired by at least one of the same camera and multiple cameras.

3. The method of claim 1 wherein the images are acquired substantially simultaneously.

4. The method of claim 1 wherein the images are acquired by at least one of a digital camera, a video camera, an infrared camera, a night vision camera, a camera with crossed polarizing lenses, and a camera on a vehicle including at least one of a car, a truck, an airplane, and an unmanned aerial vehicle.

5. The method of claim 1 further comprising digitizing at least one non-digital image.

6. The method of claim 1 wherein processing the images further comprises:
    at least partially subtracting the identified glare pattern from at least one image; and
    at least partially importing image content corresponding to the identified glare pattern from a different image not having the same identified glare pattern at the same image region.

7. The method of claim 6 wherein the imported image content includes chrominance data.

8. The method of claim 6 wherein the imported image content includes chrominance data from an exposure-bracketed image.

9. The method of claim 1 wherein the processing is performed by at least one of a camera, a personal computer, and a networked server.

10. A computer program product comprising a non-transitory computer readable medium tangibly embodying non-transitory computer readable code means thereon to cause at least one computing device to automatically remove image glare by:
    acquiring a plurality of images from a plurality of locations;
    identifying at least one glare pattern in at least one of the images;
    processing the images to remove the at least one glare pattern; and
    outputting at least one processed image;
    wherein identifying the glare pattern comprises:
        recording at least one test glare pattern on at least one test image; and
        recognizing the glare pattern by comparison against the test glare pattern.

11. The computer program product of claim 10 wherein the images are acquired by at least one of the same camera and multiple cameras.

12. The computer program product of claim 10 wherein the images are acquired substantially simultaneously.

13. The computer program product of claim 10 wherein the images are acquired by at least one of a digital camera, a video camera, an infrared camera, a night vision camera, a camera with crossed polarizing lenses, and a camera on a vehicle including at least one of a car, a truck, an airplane, and an unmanned aerial vehicle.

14. The computer program product of claim 10 wherein the computing device digitizes at least one non-digital image.

15. The computer program product of claim 10 wherein processing the images further comprises:
    at least partially subtracting the identified glare pattern from at least one image; and
    at least partially importing image content corresponding to the identified glare pattern from a different image not having the same identified glare pattern at the same image region.

16. The computer program product of claim 15 wherein the imported image content includes chrominance data.

17. The computer program product of claim 15 wherein the imported image content includes chrominance data from an exposure-bracketed image.

18. The computer program product of claim 10 wherein the computing device is at least one of a camera, a personal computer, and a networked server.

19. A system for automatic image glare removal, comprising:
   at least one image source that acquires a plurality of images from a plurality of locations; and
   at least one computing device that
      identifies at least one glare pattern in at least one of the images,
      processes the images to remove the at least one glare pattern, and
      outputs at least one processed image;
      wherein identifying the glare pattern comprises:
         recording at least one test glare pattern on at least one test image; and
         recognizing the glare pattern by comparison against the test glare pattern.

20. The system of claim 19 wherein the image source includes at least one of a single camera and multiple cameras.

21. The system of claim 19 wherein the images are acquired substantially simultaneously.

22. The system of claim 19 wherein the images are acquired by at least one of a digital camera, a video camera, an infrared camera, a night vision camera, a camera with crossed polarizing lenses, and a camera on a vehicle including at least one of a car, a truck, an airplane, and an unmanned aerial vehicle.

23. The system of claim 19 wherein the computing device digitizes at least one non-digital image.

24. The system of claim 19 wherein processing the images further comprises:
   at least partially subtracting the identified glare pattern from at least one image; and
   at least partially importing image content corresponding to the identified glare pattern from a different image not having the same identified glare pattern at the same image region.

25. The system of claim 24 wherein the imported image content includes chrominance data.

26. The system of claim 24 wherein the imported image content includes chrominance data from an exposure-bracketed image.

27. The system of claim 19 wherein the processing is performed by at least one of a camera, a personal computer, and a networked server.

28. A fee-based method for automatic image glare removal, comprising:
   charging a fee for at least one of:
      acquiring a plurality of images from a plurality of locations;
      identifying at least one glare pattern in at least one of the images;
      processing the images to remove the at least one glare pattern; and
      outputting at least one processed image;
      wherein identifying the glare pattern comprises:
         recording at least one test glare pattern on at least one test image; and
         recognizing the glare pattern by comparison against the test glare pattern.

* * * * *

UNITED STATES PATENT AND TRADEMARK OFFICE
CERTIFICATE OF CORRECTION

| | | |
|---|---|---|
| PATENT NO. | : 8,730,356 B2 | Page 1 of 1 |
| APPLICATION NO. | : 13/042381 | |
| DATED | : May 20, 2014 | |
| INVENTOR(S) | : Ansfield et al. | |

It is certified that error appears in the above-identified patent and that said Letters Patent is hereby corrected as shown below:

On the Title Page
Column 2, Item (56), OTHER PUBLICATIONS, line 5, delete "Pitsssburgh" and insert --Pittsburgh--.
Column 2, Item (56), OTHER PUBLICATIONS, line 6, delete "Converence" and insert --Conference--.

Signed and Sealed this
Twenty-first Day of October, 2014

Michelle K. Lee
*Deputy Director of the United States Patent and Trademark Office*